(12) United States Patent
Wells

(10) Patent No.: US 7,324,736 B2
(45) Date of Patent: Jan. 29, 2008

(54) INTELLIGENT RECORDING CONTROL SYSTEM

(75) Inventor: Aaron Wells, Oakland, CA (US)

(73) Assignee: LSI Logic Corporation, Milpitas, CA (US)

( * ) Notice: Subject to any disclaimer, the term of this patent is extended or adjusted under 35 U.S.C. 154(b) by 1205 days.

(21) Appl. No.: 10/268,303

(22) Filed: Oct. 9, 2002

(65) Prior Publication Data

US 2004/0071442 A1    Apr. 15, 2004

(51) Int. Cl.
*H04N 5/91* (2006.01)
(52) U.S. Cl. ........................................................ 386/68
(58) Field of Classification Search ...................... None
See application file for complete search history.

(56) References Cited

U.S. PATENT DOCUMENTS

| | | | | |
|---|---|---|---|---|
| 5,505,449 A * | 4/1996 | Eberhardt et al. | ............ | 463/29 |
| 5,650,831 A * | 7/1997 | Farwell | ....................... | 348/734 |
| 5,937,311 A * | 8/1999 | Nagatomo | ................... | 438/443 |
| 5,937,331 A * | 8/1999 | Kalluri et al. | .............. | 725/146 |
| 6,044,338 A * | 3/2000 | Akune | ........................ | 704/219 |
| 7,170,566 B2 * | 1/2007 | McGee et al. | .............. | 348/722 |
| 2003/0040962 A1 * | 2/2003 | Lewis | ......................... | 705/14 |

* cited by examiner

Primary Examiner—Thai Q. Tran
Assistant Examiner—Anner Holder
(74) Attorney, Agent, or Firm—Strategic Patent Group

(57) ABSTRACT

A method and system for synchronizing recording of data transferred from a video source device to a recording device is disclosed. The method and system include analyzing an input signal from the source device based on a set of rules. In response to detecting a source device state change, the behavior of the recording device is automatically synchronized to the detected source device state without real-time user-interactive control. More particularly, when normal play mode is detected, the recording device automatically begins recording the input signal without user control or an extra control channel.

31 Claims, 4 Drawing Sheets

INTELLIGENT RECORDING CONTROL SYSTEM

FIELD OF THE INVENTION

The present invention relates to recording systems, and more particularly to an intelligent recording controller that synchronizes data transfers between a data source device and the recording system.

BACKGROUND

Professional editing has moved from 'linear' (non-random access, typically from tape) to nonlinear (random access, typically from hard disk or disk array), but the acquisition and archive media is typically still tape. Controlling video sources and sinks (e.g., tape decks) has required separate control channels, hardware and software (e.g., from VLAN, or edit control panels). The control units require control inputs and software to communicate with these systems (e.g., using linear time code and RS422 or serial ports). Alternatively, professional video equipment can embed time codes in the video signal itself, such as a vertical interval time code, to control the recorder. The Vertical Interval Time Code (VITC), however, is difficult to use; it requires (i) that the tape be pre-formatted (a time consuming process), (ii) that the vertical blanking interval (VBI) is preserved through the video distribution network (it typically is stripped and regenerated at each node), and (iii) prior knowledge of the location of VITC in the signal so that the recording device can be properly configured to record that program. (VITC can appear on various lines in the VBI, and different sets of VITC can be present on the same tape).

With the proliferation of camcorders, video acquisition and editing is transitioning from the professional domain to the consumer domain. Recent product introductions in personal computing (e.g., Macintosh) and DVD recording have further moved recording and editing into the consumer domain. In the consumer space, a bus referred to as Firewire (IEEE1394) and its audio/video control (AV/C) protocol integrates both control and data transfer on the same wire to control a video source and a recording device. This scheme is an improvement in that it eliminates the need for a second bus. The drawbacks of this scheme is that the 1394 bus carries compressed MPEG or DV data only and requires an audio-video controller (AV/C) or target unit and sub-unit software on both devices to control and synchronize the data transfers (start or start record). Also, both the camcorder and the recording device must support the 1394 standard and implement the AV/C protocol in a compatible way to take advantage of the standard.

For camcorder formats such as 8 mm, Hi-8, VHS, or Compact VHS, IEEE 1394 is not an option. In order to record video clips onto VHS tapes, using devices without IEEE 1394, such as a camcorder and VCR, the user must connect video and audio cables from the camcorder to corresponding input jacks (RCA) on the VCR. Using controls on the camcorder, the user locates the starting position of the segment to be recorded. Typically, the user uses fast forward, reverse, slow motion, and pause modes on the camcorder. When the desired segment is found, the user presses normal "play" mode on the camcorder. The user must then press "record" on the VCR to begin the recording. Thus, the user is required to manually synchronize the recorder with the camcorder, not just for recording, but also for stopping and pausing the recording.

Although consumer editing may not require the level of control and synchronization that professional equipment or even 1394 offers, it would be desirable to have an inexpensive and generic system that synchronizes data transfers between a source device with a recording device without the need for user inter-action or an extra control channel or on the source device. The present invention addresses such a need.

SUMMARY OF THE INVENTION

The present invention provides a method and system for synchronizing the recording of data transferred from a video source device to a recording device. The method and system include analyzing an input signal from the source device based on a set of rules. In response to detecting a source device state change, the behavior of the recording device is automatically synchronized to the detected source device state without real-time user-interactive control. For example, when normal play mode is detected, the recording device automatically begins recording the input signal without user control or an extra control channel.

DETAILED DESCRIPTION

The present invention relates to video recording methods and apparatuses. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
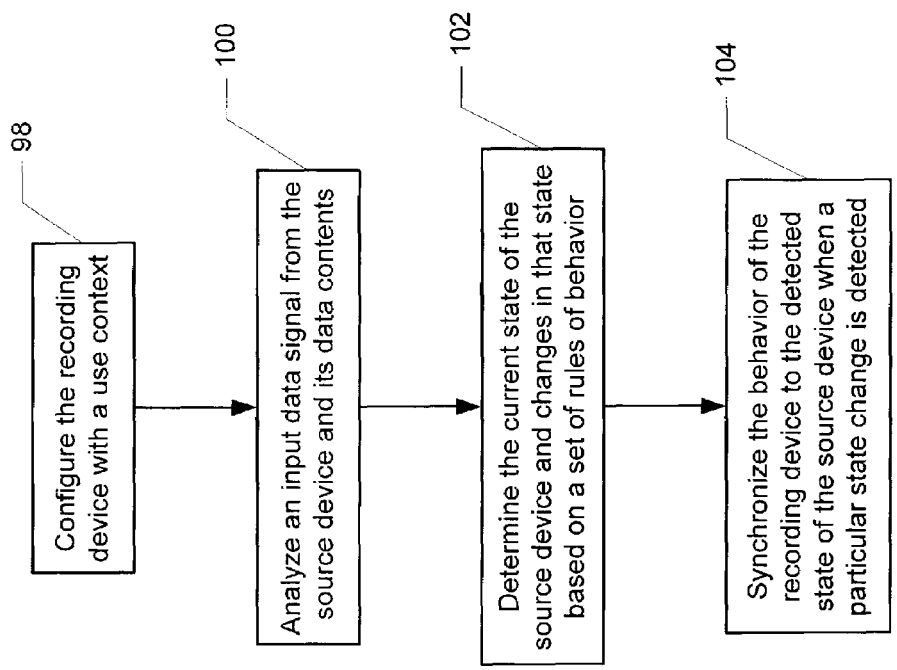
FIG. 1 is a flow chart illustrating the automatic synchronization process in accordance with a preferred embodiment.

The present invention provides a recording device with an embedded intelligent record controller (IRC) that enables the recording device to self-synchronize the recording of data transferred from a video source device for automatic recording. FIG. 1 is a flow chart illustrating the automatic synchronization process in accordance with a preferred embodiment. The process begins with step 98 where the recording device is configured with a use context.

Use context indicates the type of source device and/or the type of content in the input signal, and optionally the type of recording to device. Each use context may have its own set of rules to govern the synchronization between the two devices. In a preferred embodiment, the user places the recording device into the appropriate use context via selection from an on-screen menu displayed by the recording device. As an example, the use context could be transferring clips from a video camera (e.g., 8 mm) camcorder to a DVD+RW disk. In this example, the user would first indicate the use context to the recording device by selecting "camcorder to DVD+RW" from a context menu displayed on a TV or computer screen. In step 100, the record controller analyzes an input data signal and data contents from the source device. The result of this analysis is used in step 102 to determine the current state (behavior) of the source device, and changes in that state based on a set of rules of behavior that correspond to the use context selection. Points of interest within the contents of data stream itself, referred to as content access points, may also be analyzed. The rules of behavior include particular knowledge of the source data, and may be different for each use context and state change.

Using the context selection, the recording device can select which set of rules to use for the data analysis and for detecting video clips start and stop locations accordingly. In step 104, the recording device responds to the source device according to the rules and use context, such that when a particular state change is detected, the recording device automatically synchronizes behavior of the recording device to the detected state of the source device. More particularly, when normal play mode is detected, the recording device automatically begins recording the input signal without real-time user-interactive control, and without the need for control or status information from the source device.

The behavior of the recording device may be synchronized to either a source device state change or a data content access point so that the recorder will also pause and stop recording at appropriate points. The record device rules can also specify that the recorder should react to the source device with a particular delay or at some point of interest in the content after a particular source device state change has occurred. According to the present invention, the recorder can have various use contexts and apply different sets of rules to provide accurate control without real-time user interaction.

As an illustration, the recording device could be a video tape recorder or an optical disk recorder (e.g., DVD-R, DVD-RW, DVD+RW, DVD-VR). The program in question could be an audio/video program from a camcorder, sent as base band composite NTSC video to the recorder. The intelligent recorder of the present invention analyzes various features of the input signal, including the composite signal (timing, levels, f- and v-bit toggles) audio (muting, volume, number of channels, compression format, frequency content), visible video (motion characteristics, brightness, color saturation, black frames, VBI screen roll, repeated field or frames) and vertical blanking interval information (closed caption, wide screen signaling, v-chip rating information, copy protection). Using this information, the intelligent controller infers state changes from the source device. Source device states include normal 1× play, fast forward, pause, forward step, forward slow, reverse step, reverse slow, or fast reverse. For purpose of this description, all modes except for 1× play are considered "trick" modes.

Besides analyzing the input signal itself, the intelligent controller also analyzes the content of the input signal using motion estimation and vector analysis to detect points of interest or content access points within the data stream, such as scene changes, fade to black, and clip boundaries, and reacts to the source device according to its use context and rules.

Providing the intelligent recording controller with rules for each use context allows the recorder to respond differently to similar input data sequences, e.g., camcorder clip recording vs. TV program recording. The use context rules can specify that the recording device should pause the record session if either the source device changes state to pause, stop, fast forward, rewind; the signal is lost, or a clip change is detected (e.g., from illumination level, audio discontinuity, fade in/out). Additional behavior, such as prompting the user for a title menu or marking a 'chapter' boundary can also be part of the use context rules.

Figure 2:
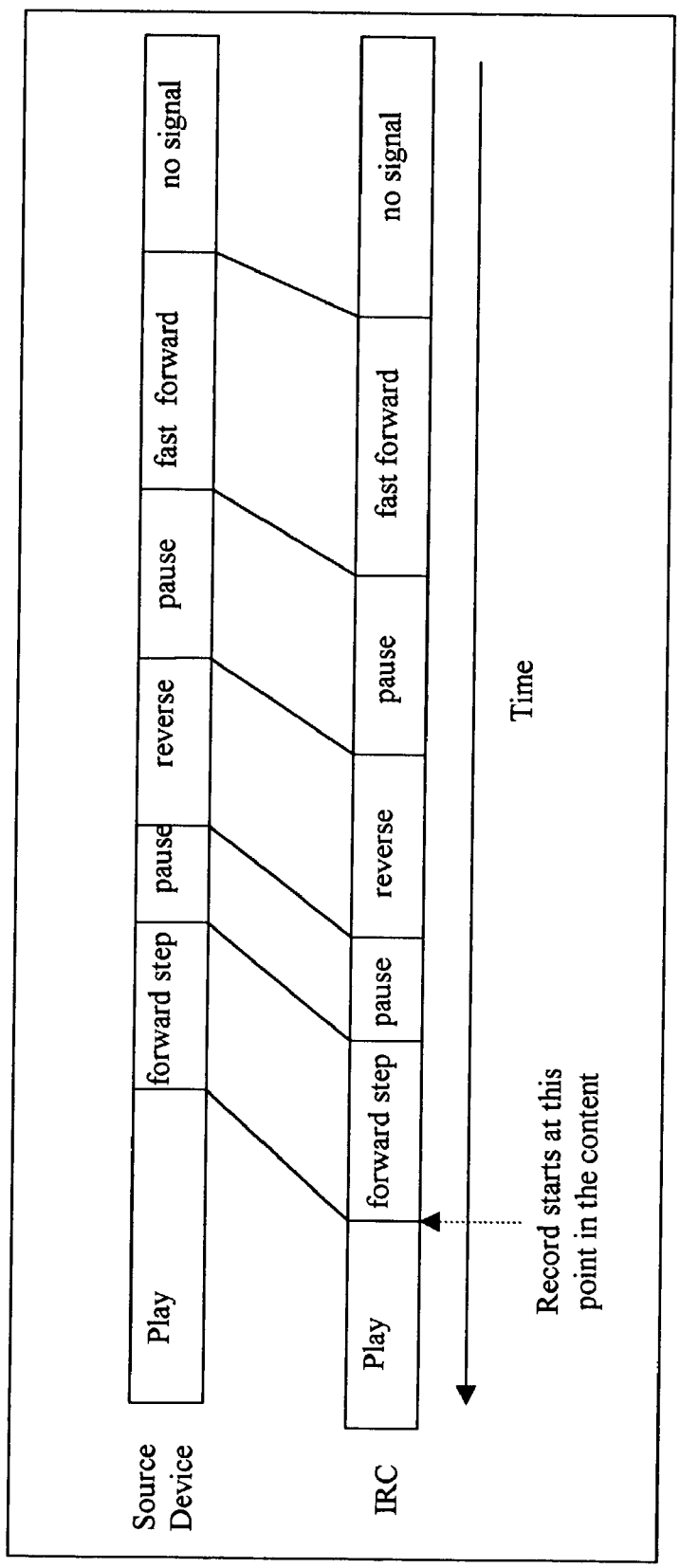
FIG. 2 is a block diagram illustrating the states of a camcorder and automatic responses from the intelligent recording device.

FIG. 2 is a block diagram illustrating the states of a camcorder and automatic responses from the intelligent recording device. After selecting the appropriate use context, the user guides the camcorder to the correct position on the tape with fast forward, pause, forward step, forward slow, reverse step, reverse slow, or fast reverse modes. Time advances from right to left as the source device is placed into these states as the user searches for the desired video clip (shown in the top row). In accordance with this context, the intelligent recording device recognizes the trick-mode input and ignores the content (shown in the bottom row). When the user presses 'play' on the camcorder, the intelligent recording device detects 1× forward play and automatically begins recording. This action automatically synchronizes the recorder operation with the player without an external control channel or any special features on the play device.

Another example of a use context for intelligent recording includes recording a TV program using a videotape VCR recorder. The desired behavior for the VCR as specified by the context rules could include automatically starting the programmed recording after the previous program has completed. It could also include eliminating intervening commercials and lead-in credits. Additionally, at the end of the program, credits (often vertically scrolling white text on a black background, or a 'squash-back' of the credits with additional programming added in the other part of the screen) can be detected and recording terminated without this trailing scene.

Existing devices may be capable of recognizing a loss of signal, illegal video input signal (beyond a certain tolerance) and can stop or pause recording in response by resuming when a legal signal is restored. 'Trick mode' video content however, (e.g., reverse, fast forward, pause, step) is often sent with a legal video (e.g., NTSC) signal. Because such devices analyze the received analog signal only and not the content of the signal, these devices fail to recognize trick modes. Where content analysis is included in existing devices, e.g., DVD decoders, it is typically only black frame detection, and does not include any motion estimation or vector field analysis.

In a preferred embodiment, the recording device includes a delay buffer memory for storing some amount of the input signal so that data content access points can be detected based on information in the signal from both before and after that point. The recognition of the source state is delayed in time through use of the delay buffer, which permits the recording device to apply the desired processing (in this case record) at the correct point in the content. The delay buffer allows video start and stop locations to be identified after they have already passed, and to then retroactively use them as control input to control the beginning and ending of the recording session on the recording media. Thus, delayed control input is applied to data in the buffer at the point inferred from the intelligent record controller.

Figure 3:
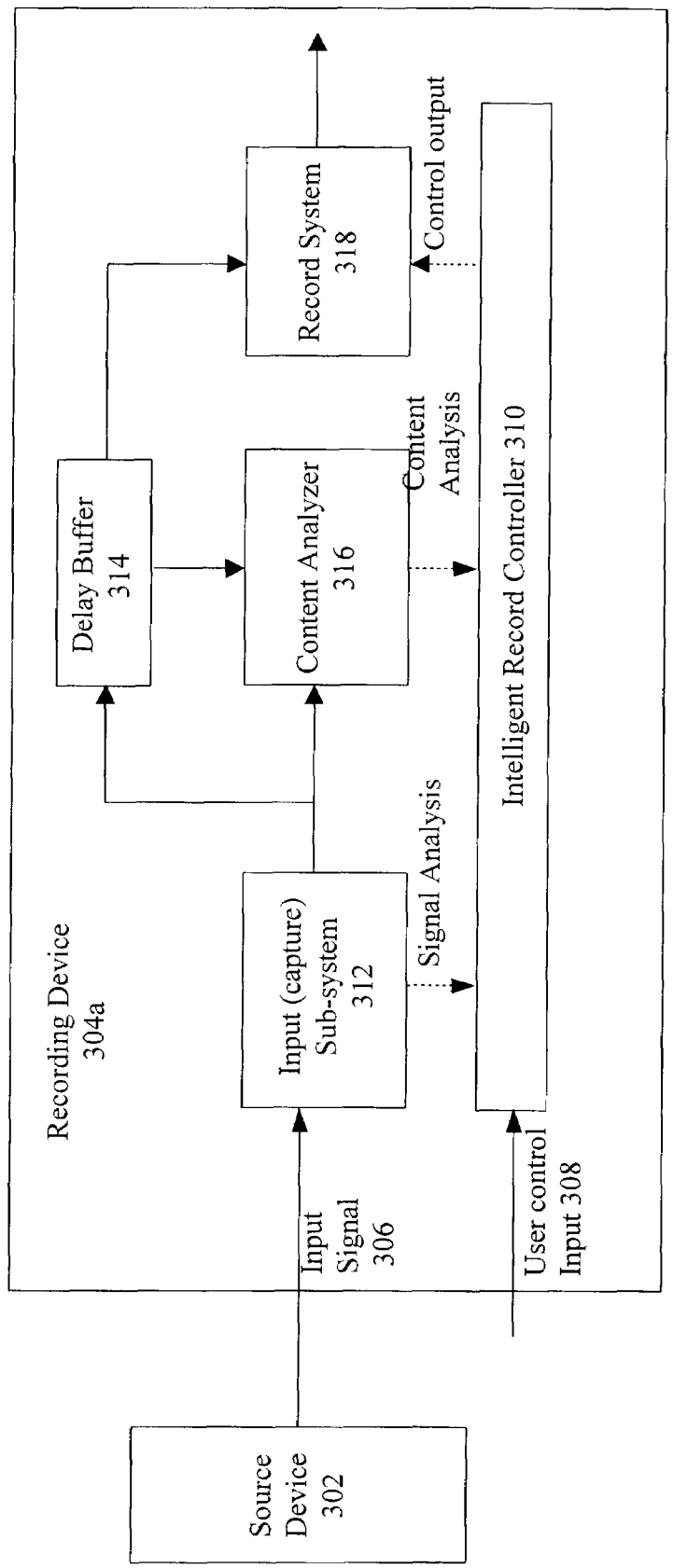
FIG. 3 is a block diagram illustrating an intelligent recording control (IRC) system in accordance with a first preferred embodiment of the present invention.

FIG. 3 is a block diagram illustrating an intelligent recording control (IRC) system in accordance with a first preferred embodiment of the present invention. The IRC system 300 includes a recording device 304*a* and a source device 302. The recording device 304*a* includes an intelligent record controller (IRC) 310, an input capture subsystem 312, a delay buffer 314, a content analyzer 316, and a record system 318.

The input capture subsystem 312 receives the input signal 306 from the source device 302 on standard RCA or S-video jacks, and optionally and optionally analyzes the input signal 306 itself, but not its contents. The input capture subsystem 312 outputs a value to IRC 310 indicating whether the signal is present and valid, and passes the input signal 306 to the delay buffer 314 and to the content analyzer 316.

The content analyzer 316 analyzes the content of the video frames comprising the input signal 306, and the delay buffer 314 stores a series of frames that occur both before and after the current frame being analyzed by the content analyzer 316. The content analyzer 316 performs both spatial and temporal analysis. Spatial analysis analyzes the pixels within a single frame to determine if the image is still or depicts motion. Temporal analysis compares a current frame with adjacent frames and checks for redundancy between the frames. The content analyzer 316 also checks for graphic overlays in the frame, which may indicate the start or end of a movie clip. The content analyzer 316 outputs content analysis to the IRC 310 in the form of scalar values and vectors, e.g., DC values of average brightness, frequency histograms, average motion vector, status of audio, and so on.

The user can provide configuration, use context, and control information to the IRC 310 via a user control input signal 308. As stated above, the user may enter the use context information by selecting items on an on-screen menu using a remote control. The user input can either precede the content to which it pertains, as in the first and second embodiments, or can be delayed, and be applied to content received earlier, as described in the third embodiment below.

The IRC 310 takes the output of the input capture subsystem 312 and the content analyzer 316 and applies the rules of behavior that correspond to the use context selected by the user to deduce the state of the source device 302. Based on the detected state of the source device 302 and the applicable context rules, the IRC 310 controls operation of the record system 318.

In the embodiment above, the input signal 306 from the source device 302 is recorded and stored in uncompressed form by the recording device 304a. Storing uncompressed video images consumes a large amount of system memory, which contributes significantly to system cost.

In accordance with a second preferred embodiment of the present invention, the recording device is provided with a second larger memory to provide a more sophisticated recording system that employs the IRC 310 in conjunction with an audio/video compressor and decompressor (encoder/decoder, or 'codec') as follows.

Figure 4:
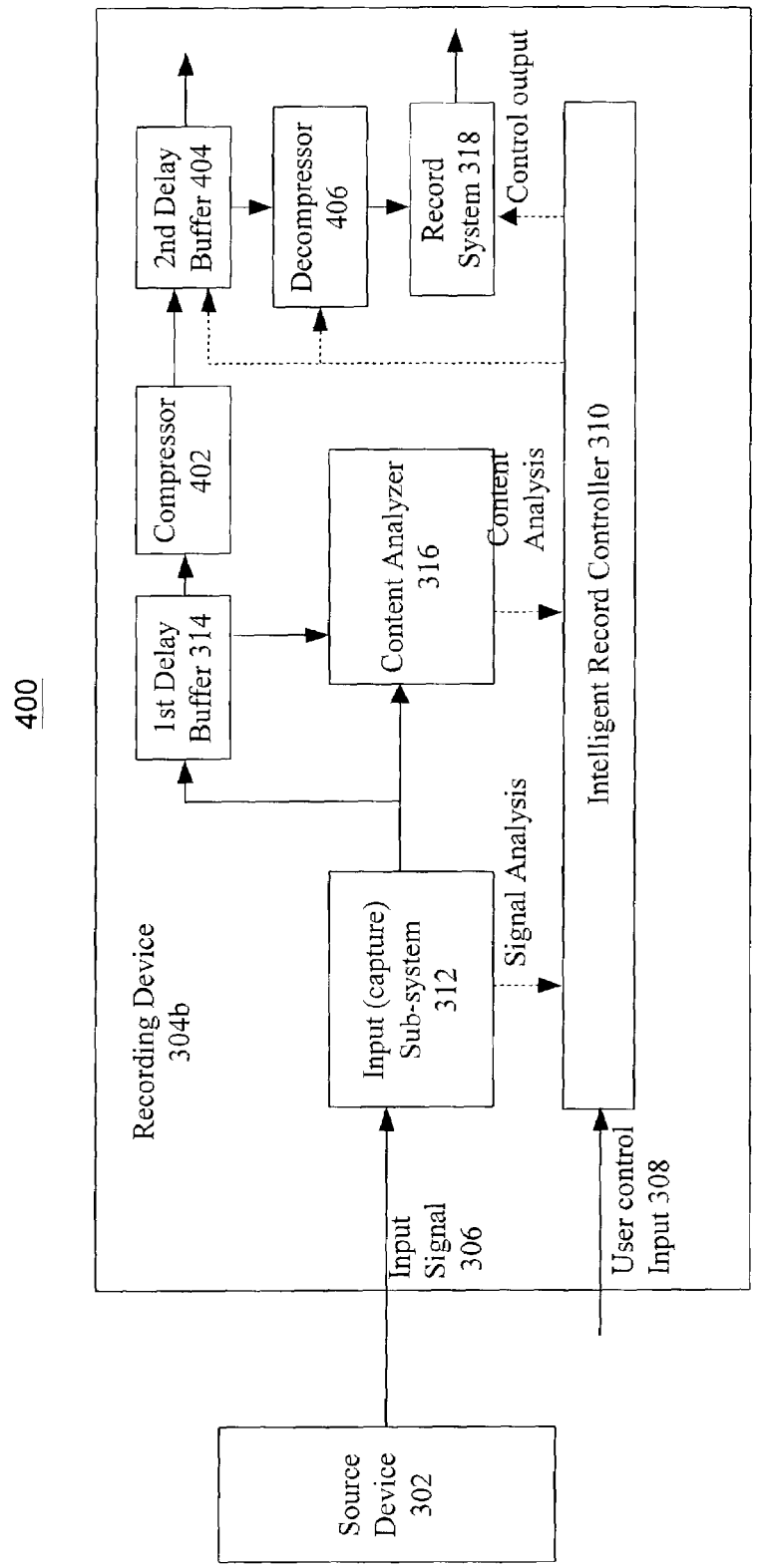
FIG. 4 is a block diagram illustrating the IRC integrated with a codec.

FIG. 4 is a block diagram illustrating the IRC integrated with a codec, where like components from FIG. 3 have like reference numerals. In the second embodiment, the IRC system 400 includes a recording device 304b that further includes a first uncompressed delay buffer 314 for local temporal content analysis, a content compressor 402, a second compressed delay buffer 404 for buffering large amounts of data, and a decompressor 406. In a preferred embodiment, the system 400 captures and compresses frames of the input signal 306 and stores them in the second delay buffer 404 prior to further processing (e.g., recording to VHS tape).

The memory required to store the compressed program is substantially less (often 10× or more) than uncompressed storage of the same duration would otherwise require. With the second delay buffer 404, the system 400 is capable of storing a 'long enough' period of the input signal in system memory ('long enough' being determined by system design and application constraints) to apply the intelligent record controller rules to the output of the content analyzer, thereby providing more look-ahead statistics for improved recording functionality. Finally, the necessary parts of the stored signal are decompressed by decompressor 406 in order to provide the video/audio in its standard format for further processing (e.g., record the desired parts of the input signal 306 to tape). The IRC 310 may be required to provide control of the second delay buffer 404 and decompressor 406 for proper system function.

The system 400 may also output the compressed signal from the second delay buffer 404 to other processing units (e.g., DVD recorder, Digital TV, wireless communication network, USB, 1394, or ethernet connection to a PC). Thus, the system 400 may output uncompressed content only, compressed content only, or both. In addition, although the direct application of the IRC 310 is to audio/video recording, the IRC 310 could also be applied to data applications as well, e.g., using Lempel-Ziv-Welch (LZW).

The compression/decompression can be more or less transparent to the viewer depending on the various factors, including the compression scheme employed (e.g., long-GOP MPEG vs. JPEG), the tape format (e.g., VHS vs. D-1), any intermediate processing (e.g., analog composite NTSC transmission vs. Y/C or serial-D1) and the viewing environment and display characteristics. As an example, for consumer applications, long-GOP MPEG at 6 Mbps should be essentially transparent after VHS recording and playback for standard definition video. The compression can include image resampling (horizontal and/or vertical decimation) with or without the use of MPEG, JPEG, DV, or more sophisticated compression schemes.

In a third embodiment of the present invention, the user is provided with intelligent interactive/retroactive control of the recording device. According to this aspect of the present invention, the user may use the IRC-equipped recording device 304 in a semi-automatic mode wherein the user monitors the video while it is being processed by the recording device 304 (e.g., DVD-recorder). When the user sees the point at which he wants recording to commence, he issues a control command to the recording device 304. Given the delays of human recognition, response, and the delay of the system in responding to a control input, the desired start point may be several seconds in the past. During this period of time, the intelligent recording device 304 has been buffering the incoming signal 306, for a period of time long enough to account for user response delay, and then processes that input signal 306 according to its current state of operation. The content analyzer 316 in the intelligent recorder 304 recognizes and logs the location of interesting features in the input signal 306, scene cuts and preferably record commencement points (e.g., end of commercial advertisement) at all times or retroactively, in response to use input. When a control input is received from the user, the record controller applies that command to take effect at the most likely point of interest in signal 306. Thus, the recording device 304 can be programmed to recognize and skip recordings of commercial and other unwanted content.

Illustratively, the recording device 304 could be a DVD-recorder, and the control device issuing the control input signal 308, an infrared remote control. The input signal 306 could be a television program and points of interest within that program could be scene changes or commercial start and stop points. As the user views the program, he may have to set the DVD-recorder to idle state. The intelligent recorder 310 within the DVD recorder is, nonetheless, capturing and processing the input video. The user sees the point that recording should start and sends an IR "record" input to the DVD-recorder. The delay in reacting to the video may be several (e.g., 10) seconds. However, because the DVD recorder has been buffering the input program (in either compressed or uncompressed format, depending on product feature) the recorder 304 can start the recording at the most likely scene change recognized between 5 to 10 seconds earlier in the input video.

Hard disk television recorder ("PVR") products (e.g., from SonicBlue and Tivo) have a skip commercial feature. These devices, however, do not suppress recording of commercials, but rather record all of the program and compile a play list of sections to skip on playback. This PVR feature differs from the invention described in this disclosure in that it is tailored for television recording and commercial skipping in a hard disk environment. PVR's are not useful for editing applications (e.g., from camcorder) or for tasks other than commercial elimination. In optical disk recording (as opposed to hard disk recording), capacity is more limited and it is undesirable to record the portions of the stream which are to be skipped at playback, and seek time associated with noncontiguous play can create performance problems. Finally, in DVD-Video compatible formats (e.g., DVD-R, DVD-RW, DVD+RW) the program is required to be contiguous, with in- and out-points constrained by the format. There is also a retroactive resume from commercial feature in some DVD boxes. This feature applies to playback, not record, and jumps back a fixed amount (typically 7 seconds) into the recorded program. High-end VCRs also have a commercial recognition and skip feature. As with the PVRs, this is tailored to commercial recognition and skipping during playback, and does not suppress the recording of the commercial onto the tape in the first place.

Note that the data stream processed in this way could be a audio/video television program, or could equally well be a multi-media internet broadcast, a stock quote data feed (e.g., which is overlaid as a 'crawl' on a TV screen) radio (audio) program, or telephone conversation. Points of interest can be explicitly signaled in the stream (e.g., wide screen signaling transitions, 'V-Chip' or other ratings changes), or extracted by a content analyzer (e.g., commercial recognition content analyzer, silence detector, or specialized content recognition 'circuitry').

An intelligent recording control system has been disclosed. The present invention has been described in accordance with the embodiments shown, and one of ordinary skill in the art will readily recognize that there could be variations to the embodiments, and any variations would be within the spirit and scope of the present invention. In addition, software written according to the present invention may be stored on a computer-readable medium, such as a removable memory, or transmitted over a network, and loaded into the recording device for execution. Accordingly, many modifications may be made by one of ordinary skill in the art without departing from the spirit and scope of the appended claims.

What is claimed is:

1. A method for synchronizing a data transfer from a source device to a recording device, the method comprising:
   (a) analyzing by the recording device an input signal from the source device;
   (b) determining by the recording device a current state of the source device from the analysis of the input signal;
   (c) receiving context rules by the recording device, the context rules comprising behavior of the recording device corresponding to states of the source device; and
   (d) recording the input signal by the recording device according to the current state of the source device and the context rules, wherein the recording of the input signal by the recording device is automatically synchronized with the output of the input signal from the source device without a control mechanism on the source device.

2. The method of claim 1 further comprising:
in response to detecting a source device state change that indicates normal play mode, automatically beginning recording the input signal.

3. The method of claim 2 wherein the source device states further include, fast forward, forward slow, pause, reverse slow, and fast reverse.

4. The method of claim 3 further comprising:
analyzing content of the input signal to detect content access points, and synchronizing behavior of the recording device according to the detected content access points.

5. The method of claim 4 wherein the content access points comprise scene changes.

6. The method of claim 5 further comprising:
synchronizing the behavior of the recording device to either a source device state change or data content access point so that the recording device will pause and stop recording at appropriate points.

7. The method of claim 1 further comprising:
providing the recording device with rules specifying that the recording device should react to the source device with a particular delay or at some point of interest in the content after a particular source device state change has occurred.

8. The method of claim 7 further comprising:
providing the recording device with rules for different use contexts, such that the recording device responds differently to similar input data sequences.

9. The method of claim 8 further comprising:
detecting video clip start and stop locations.

10. The method of claim 9 further comprising:
receiving a control input after the clip start or stop, and applying the control input retroactively to control beginning and ending of the recording on a recording media.

11. The method of claim 1 further comprising:
applying compression and decompression to the input signal for intermediate look-ahead storage.

12. An intelligent recording control system, comprising:
an input capture subsystem for receiving an input signal from a source device;
a delay buffer coupled to the input capture subsystem for temporarily storing frames of the input signal;
a content analyzer coupled to the input capture subsystem and to the delay buffer for performing spatial and temporal analysis on the frames of the input signal and providing content analysis output;
a record system coupled to the delay buffer for recording the input signal; and
a record controller coupled to the input capture subsystem, the content analyzer, and the record system, the record controller for detecting a current states of the source device based on the content analyses output and for controlling operation of the record system in the recording of the input signal according to the current state of the source device and context rules, the context rules comprising behavior of the record system corresponding to states of the source device, wherein the recording of the input signal is automatically synchronized with the output of the input signal from the source device without a control mechanism on the source device.

13. The system of claim 12 wherein the states of the source device include play, fast forward, forward slow, pause, reverse slow, and fast reverse.

14. The system of claim 13 wherein the record controller causes the record system to record the input signal when the play state is detected.

15. The system of claim 14 wherein the record controller synchronizes the recording system based on either a source device state change, or a detected data content access point so that the recording system will pause and stop recording at appropriate points.

16. The system of claim 12 further including:
a compressor for compressing the input signal;
a second delay buffer for storing the compressed input signal; and
a decompressor for decompressing necessary portions of the input signal prior to recording;
wherein the content analyzer analyzes the input signal stored in the delay buffer while the second delay buffer stores the compressed input signal to thereby provide more look-ahead statistics for improved recording functionality.

17. The system of claim 16 wherein the compressed input signal is output from the second delay buffer to another processing unit.

18. The system of claim 16 wherein the record controller further:
receives a delayed control input from a user to begin recording, wherein the user's record start location in the incoming input signal has passed and is stored in the second delay buffer;
uses the content analysis output to find a content point in the stored input signal representing the record start location; and
instructs the record system to begin recording at the content point in the stored input signal.

19. The system of claim 18 wherein the content point in the stored input signal representing the record start location comprises a scene change.

20. The system of claim 18 wherein the record system suppresses recording of TV commercials during the recording.

21. The method of claim 1 wherein the analyzing (a) comprises: receiving from a user an indication of a use context, and selecting a set of rules corresponding to that use context to apply to the analysis.

22. The method of claim 1 wherein the analyzing (a) comprises further: displaying an on-screen menu listing a plurality of use contexts and allowing the user to select one using a remote control.

23. The method of claim 1 wherein the analyzing (a) comprises: analyzing features of the input signal, including timing, levels, and field timing- and vertical-bit toggles.

24. The method of claim 1 wherein the analyzing (a) comprises: analyzing features of audio included in the input signal including muting, volume, number of channels, compression format, and frequency content.

25. The method of claim 1 wherein the analyzing (a) comprises: analyzing features of visible video including motion characteristics, brightness, color saturation, black frames, VBI screen roll, and repeated field or frames.

26. The method of claim 1 wherein the analyzing (a) comprises: analyzing vertical blanking interval information including closed caption, wide screen signaling, v-chip rating information, and copy protection.

27. The method of claim 1 wherein the analyzing (a) comprises: analyzing content of the input signal using motion estimation and vector analysis to detect content access points within the data stream, such as scene changes, fade to black, and clip boundaries.

28. The method of claim 1 wherein the determining (b) comprises: detecting source device states including normal 1× play, fast forward, pause, forward step, forward slow, reverse step, reverse slow, and fast reverse.

29. The method of claim 1 further comprising:
buffering the input signal prior to the analysis.

30. The method of claim 29 further comprising:
compressing the input signal and decompressing the input signal prior to recording.

31. The method of claim 1 further comprising:
(i) buffering the input signal;
(ii) receiving a delayed user control input to begin recording; and
(iii) starting recording of the input signal at a content access point representing a scene change that occurred earlier in the input signal.

* * * * *